United States Patent [19]

Fassnacht

[11] 4,204,214
[45] May 20, 1980

[54] SLEWING AND TRACKING MECHANISM FOR DISH STRUCTURE

[75] Inventor: Charles J. Fassnacht, Thousand Oaks, Calif.

[73] Assignee: Datron Systems, Inc., Chatsworth, Calif.

[21] Appl. No.: 958,015

[22] Filed: Nov. 6, 1978

[51] Int. Cl.² .............................................. H01Q 3/00
[52] U.S. Cl. .................................... 343/766; 343/765; 343/912
[58] Field of Search ............... 343/765, 766, 761, 763, 343/912; 250/203 R; 126/270, 271

[56] References Cited

U.S. PATENT DOCUMENTS

| | | | |
|---|---|---|---|
| 2,651,721 | 9/1953 | Bergey et al. | 343/766 |
| 4,020,491 | 4/1977 | Bieser et al. | 343/765 |

*Primary Examiner*—David K. Moore
*Attorney, Agent, or Firm*—Edward A. Sokolski

[57] ABSTRACT

A large dish member for use as a solar collector, radar antenna or the like is mounted on a tripod structure on a first set of bearings which permit rotation about a polar or azimuth axis, and a second set of bearings which permit rotation about an elevation axis. Drive about the elevation axis is achieved by means of a linear actuator with elevation position being sensed by means of a position transducer such as a selsyn. Drive about the polar or azimuth axis is achieved by means of two motors, one for slow drive, the other for fast drive, both of these motors being coupled through a timing belt drive and worm gear reducer to a drive sprocket. The drive sprocket engages a chain which is welded to the rim of an arcuate spoked drive member in the form of a wheel segment, which is fixedly attached to the dish member and mounted for rotation on the support structure. A position selsyn is provided to sense azimuthal or polar position. The sprocket wheel thus engages and drives the chain and the arcuate drive member to which it is attached about the polar axis, this drive member carrying the dish along with it, while the linear actuator is used to raise and lower the dish in elevation.

8 Claims, 4 Drawing Figures

SLEWING AND TRACKING MECHANISM FOR DISH STRUCTURE

This invention relates to dish members for use as solar collectors, radar antennas or the like, and more particularly to a drive system for such a device.

Large dishes for use as solar collectors or radar antennas (i.e., of the order of 10 or more feet in diameter) must be accurately and reliably slewed and tracked in both azimuth and elevation. This presents something of a mechanical problem in view of the large size and weight of such units. Linear actuators readily lend themselves to elevation drive and are generally used for this purpose. It would appear on initial evaluation that a ring gear drive would best suit itself to driving this type of device about the polar axis. However, to fabricate a ring gear of the size needed for the large structures contemplated presents a difficult and expensive task. In view of the complexities and expense involved in the mechanization of a ring gear drive for this type of device, linear actuators have been employed in the prior art for polar drive as well as elevation drive. This necessitates the use of a pair of linear actuators for polar drive, each of which drives the device through a 90° segment about the polar axis. This involves a rather cumbersome structure and requires actuators that can operate at two speeds to drive the dish at the faster slew rate required and the slower tracking rate. Such two-speed linear actuators are somewhat expensive in their construction.

The device of the present invention provides an improvement over prior art polar drive systems for large dish structures by employing a sprocket and chain drive, the sprocket being rotatably driven by first and second speed motors coupled to a common drive mechanism, while the chain is welded to the edge of an arcuate polar drive member which is in the form of a segment of a wheel. This makes for a greatly simplified and more economical construction than prior art gear drives, at the same time affording all the advantages thereof over linear actuators, such as a greater apparent slewing range and simpler and better speed control, since this type of drive can be driven from a single gear chain which is driven by a pair of different speed motors.

It is therefore an object of this invention to provide a simpler and more economical polar drive mechanism for a large size dish, such as might be employed in a solar collector or radar system.

It is a further object of this invention to provide an economical polar drive mechanism for a large size dish having a simpler and more accurate means for a two-speed drive.

Other objects of this invention will become apparent as the description proceeds in connection with the accompanying drawings, of which:

Figure 1:
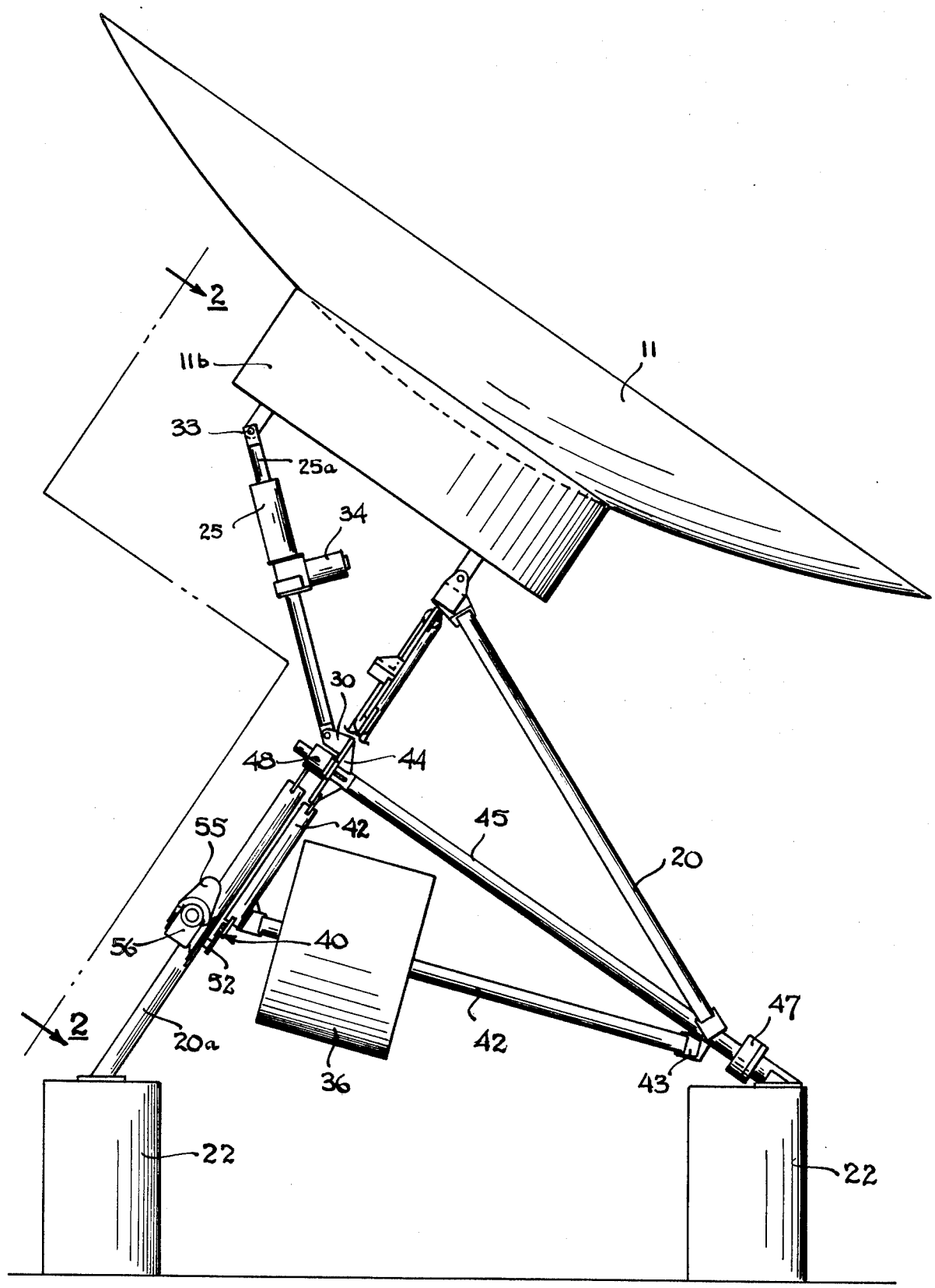
FIG. 1 is a side elevational view of a preferred embodiment of the invention.
Figure 2:
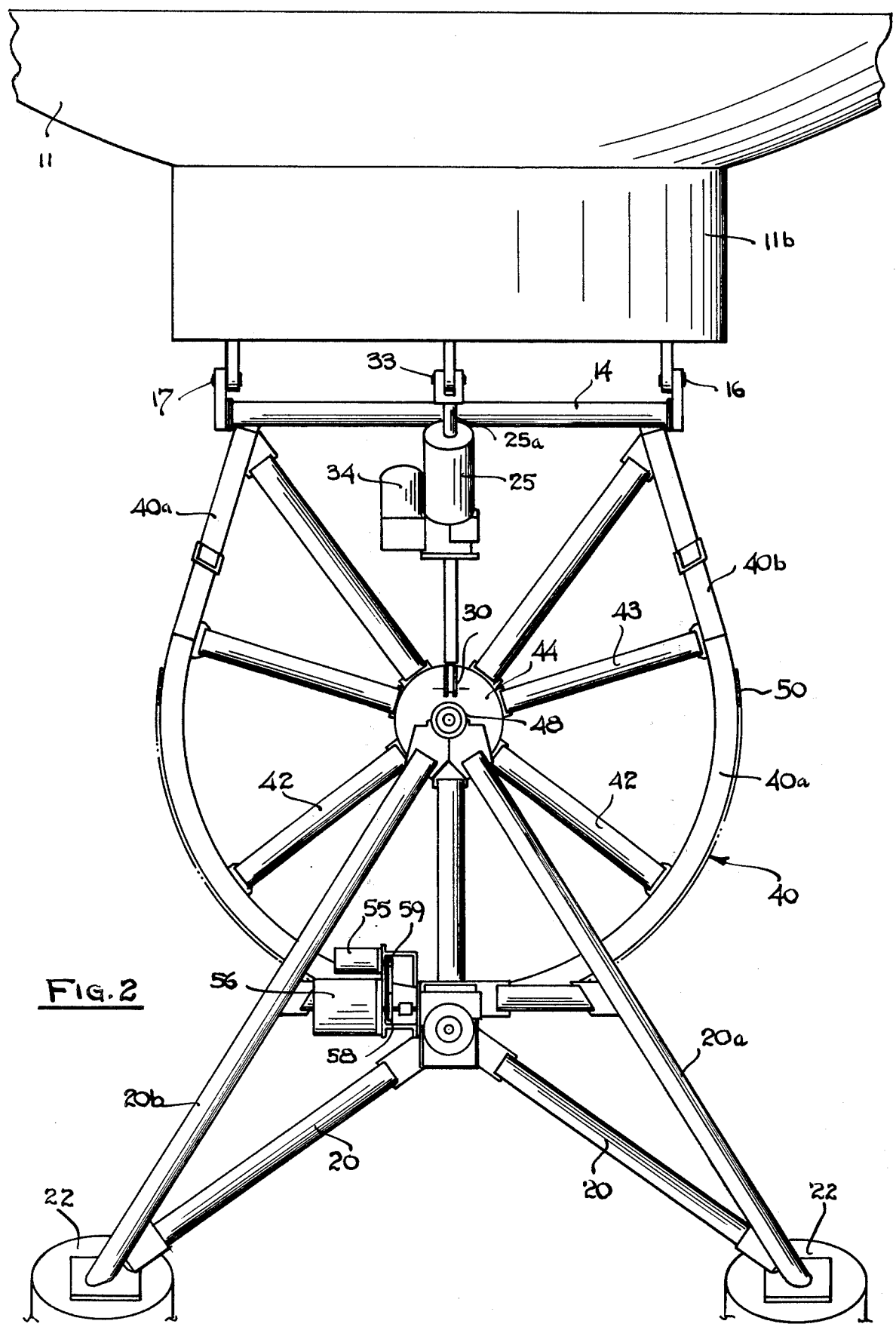
FIG. 2 is a view taken along the line indicated by 2—2 in FIG. 1.

Referring now to FIGS. 1 and 2, a preferred embodiment of the invention is illustrated. Dish member 11, which may be a solar collector or a radar antenna, is supported for rotation about an elevation axis on cross bar 14 by means of sleeve bearings 16 and 17. Cross bar 14 is in turn supported on wheel structure 40. The antenna is driven in elevation by means of linear actuator 25 which is pivotally supported on the hub 44 of the wheel structure 40 by means of clevis 30. The shaft 25a of the linear actuator is pivotally connected to the back portion 11b of the dish by means of clevis 33. Elevational position is sensed by means of selsyn 34 which is mounted on the elevation axis clevis.

As dish 11 is generally the order of 10 or more feet in diameter and is quite heavy, a counterweight 36 which is supported between support frame structure 20 and the wheel structure 40 is required to counterbalance the dish about the polar axis. Counterweight 36 is attached to wheel structure 40 and thus moves therewith in azimuth as the dish is driven about the polar axis. The counterweight is supported on shaft 42 which in turn is supported on shaft 45 for pivotal motion by means of pivotal bearing 43.

Wheel structure 40 has a first arcuate section 40a which is in the form of a segment of a circle and second and third portions 40b and 40c which are in the form of substantially linear arms which are used to attach the circular portion to cross bar 14. Wheel sructure 40 is strengthened by a plurality of struts 43 which run between the rim thereof and a central hub 44. Hub 44 is fixedly attached to shaft 45 which is rotatably mounted on one of pillars 22 in sleeve bearing 47. A second sleeve bearing 48 is fixedly supported on pipe members 20a and 20b which are fixedly attached at one end thereof to pillars 22 and at the other end thereof to sleeve bearing 48, this sleeve bearing rotatably supporting one end of shaft 45 and wheel hub 44.

Figure 3:
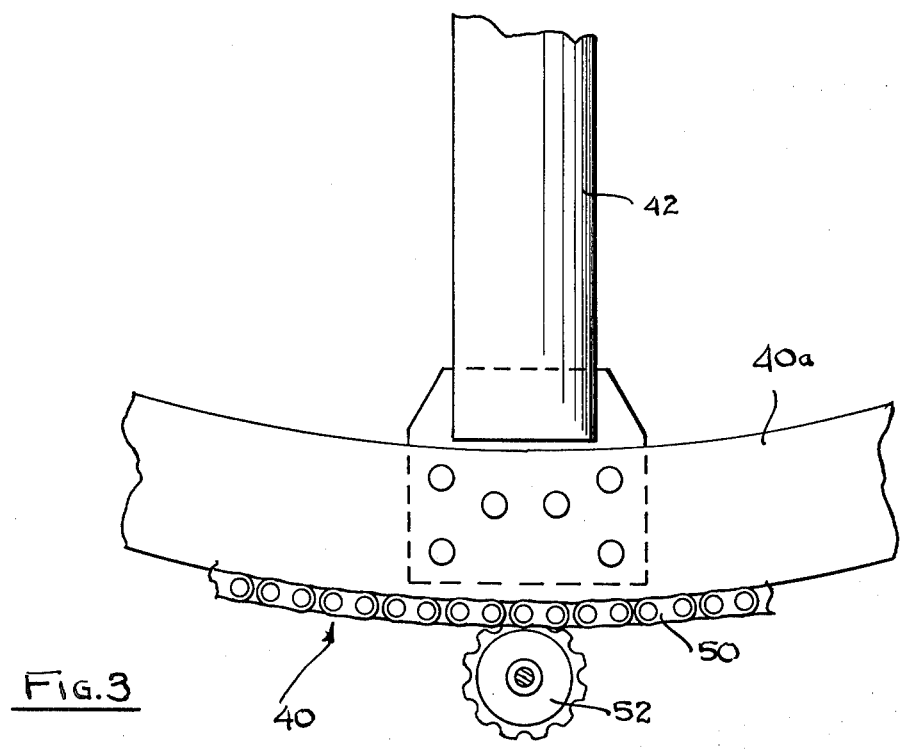
FIG. 3 is a fragmentary view showing the sprocket and chain drive mechanism of the preferred embodiment.
Figure 4:
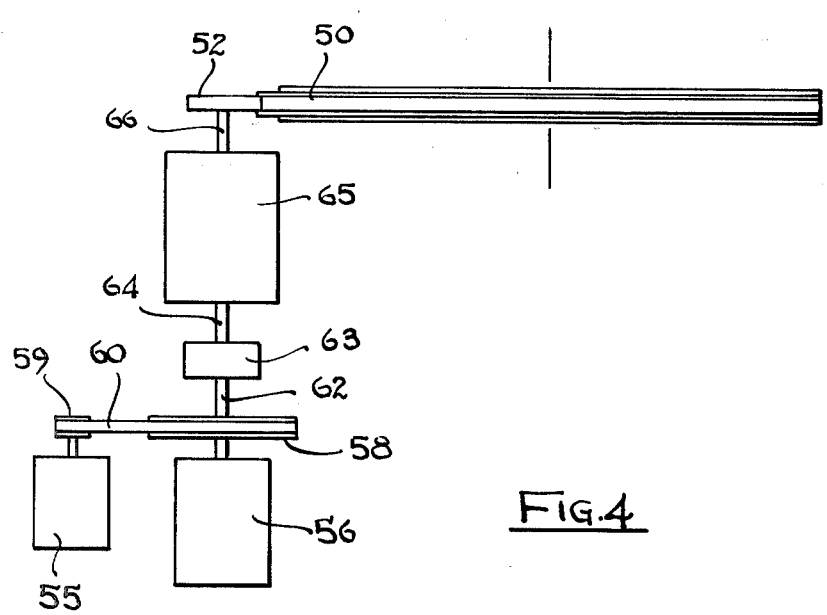
FIG. 4 is a schematic view showing the two-speed drive mechanism of the preferred mechanism.

The arcuate portion 40a of wheel structure 40 has a chain drive member 50 welded to the rim thereof, as can best be seen in FIG. 3. This chain is rotatably driven by sprocket wheel 52, as best can be seen in FIGS. 3 and 4. Sprocket wheel 52 is driven by means of a drive mechanism which originates with a lower speed motor 55 and a higher speed motor 56. Motor 55 is used to control tracking of the device, while motor 56 is used to control slewing. The drive shaft of motor 56 is connected directly to pulley wheel 58, the drive shaft of motor 55 being connected to pulley wheel 58 through smaller pulley wheel 59 and drive belt 60. Pulley wheel 58 is connected by means of shaft 62 to reverse locking clutch 63, the clutch in turn being coupled through shaft 64 to worm gear reducer 65. Shaft 66 connects the output of gear reducer 65 to sprocket wheel 52.

The device thus can be driven about its polar axis at either one of two speeds through a common drive mechanism in a simple and highly efficient manner. The sprocket and chain drive, implemented by welding the chain to the rim of the arcuate wheel segment, enables this mechanization to be achieved at a relatively low cost as compared with prior art gear drives and linear actuators.

While the invention has been described and illustrated in detail, it is to be clearly understood that this is intended by way of illustration and example only and is not to be taken by way of limitation, the spirit and scope of this invention being limited only by the terms of the following claims.

I claim:

1. A drive mechanism for a dish structure comprising:

an azimuth drive member having an arcuate section forming a segment of a circle, means for connecting the ends of said arcuate secsection to said dish for pivotal motion relative thereto, means for rotatably supporting said drive member for rotation about a polar axis, a chain fixedly attached to the rim of the arcuate section of said drive member, a sprocket wheel, means for rotatably mounting said sprocket wheel with the teeth thereof in engagement with said chain, and means for rotatably driving said sprocket wheel to cause said drive member and said dish to be driven about a polar axis.

2. The mechanism of claim 1 and further including linear actuator means mounted for rotation with said dish and said azimuth drive member for driving said dish about an elevation axis.

3. The mechanism of claim 1 wherein said means for connecting the arcuate section to said dish comprises first and second substantially linear sections extending from the ends of said arcuate section and means for pivotally attaching the ends of said linear sections to said dish.

4. The mechanism of claim 1 wherein the means for driving said sprocket wheel comprises a lower speed motor and a higher speed motor, a pulley wheel having a drive shaft directly driven by said higher speed motor, the wheel of said pulley wheel being driven by said lower speed motor, and gear means for coupling the drive shaft of said pulley wheel to said sprocket wheel.

5. The mechanism of claim 3 wherein the drive member includes a central hub and a plurality of struts running between said hub and the arcuate and linear sections.

6. The mechanism of claim 5 wherein the means for rotatably supporting said drive member comprises a shaft drive member fixedly attached to the hub at one end thereof and support means, the other end of the shaft being rotatably supported on said support means.

7. The mechanism of claim 6 and further including a counterweight on said drive member for counterbalancing the drive member about the polar axis.

8. The mechanism of claim 7 wherein the means for supporting the counterweight on the drive member comprises a shaft, said shaft being supported on the drive member shaft for pivotal motion relative thereto.

* * * * *